(12) United States Patent
Roichman et al.

(10) Patent No.: US 10,387,656 B2
(45) Date of Patent: Aug. 20, 2019

(54) INTEGRATED INTERACTIVE APPLICATION SECURITY TESTING

(71) Applicant: Checkmarx Ltd., Ramat Gan (IL)

(72) Inventors: Alexander Roichman, Petah-Tikva (IL); Maty Siman, Tel Aviv (IL); Shimon Eshkenazi, Bat-Yam (IL)

(73) Assignee: Checkmarx Ltd., Ramat Gan (IL)

( * ) Notice: Subject to any disclaimer, the term of this patent is extended or adjusted under 35 U.S.C. 154(b) by 261 days.

(21) Appl. No.: 15/453,919

(22) Filed: Mar. 9, 2017

(65) Prior Publication Data

US 2017/0270303 A1 Sep. 21, 2017

Related U.S. Application Data

(63) Continuation of application No. PCT/IB2017/051321, filed on Mar. 7, 2017.

(60) Provisional application No. 62/310,827, filed on Mar. 21, 2016.

(51) Int. Cl.
*H04L 29/06* (2006.01)
*G06F 21/57* (2013.01)
*H04L 29/08* (2006.01)
*G06F 11/36* (2006.01)

(52) U.S. Cl.
CPC ........ *G06F 21/577* (2013.01); *G06F 11/3668* (2013.01); *H04L 63/1425* (2013.01); *H04L 63/1433* (2013.01); *H04L 67/02* (2013.01); *G06F 2221/033* (2013.01)

(58) Field of Classification Search
CPC .................................................. G06F 21/577
See application file for complete search history.

(56) References Cited

U.S. PATENT DOCUMENTS

| 7,237,265 B2* | 6/2007 | Reshef .................. G06F 21/554 709/203 |
| 7,392,545 B1 | 6/2008 | Weber et al. |
| 7,647,631 B2* | 1/2010 | Sima ..................... G06F 21/577 709/201 |
| 7,975,296 B2* | 7/2011 | Apfelbaum ........... G06F 21/577 726/22 |

(Continued)

FOREIGN PATENT DOCUMENTS

| CN | 106066827 A | * 11/2016 |
| CN | 107463505 A | * 12/2017 |

(Continued)

OTHER PUBLICATIONS

Shuai, Bo, et al. "Software vulnerability detection based on code coverage and test cost." 2015 11th International Conference on Computational Intelligence and Security (CIS). IEEE, 2015. (Year: 2015).*

(Continued)

*Primary Examiner* — Shawnchoy Rahman
(74) *Attorney, Agent, or Firm* — Kligler & Associates

(57) ABSTRACT

A method for testing a software application program includes recording a sequence of functional tests that are applied to the program and automatically identifying and collapsing sessions within the recorded functional tests. Modified tests are created by replacing parameters in the collapsed sessions with malicious inputs. The modified tests are applied to the program in order to detect security vulnerabilities in the program.

24 Claims, 3 Drawing Sheets

(56) References Cited

U.S. PATENT DOCUMENTS

| | | | |
|---|---|---|---|
| 8,819,772 B2 | 8/2014 | Bettini et al. | |
| 8,844,043 B2 | 9/2014 | Williams et al. | |
| 8,898,272 B1* | 11/2014 | Young | H04L 63/0407 |
| | | | 709/223 |
| 9,317,399 B2 | 4/2016 | Boshernitsan et al. | |
| 9,882,930 B2 | 1/2018 | Holt | |
| 9,946,880 B2 | 4/2018 | Lee et al. | |
| 2004/0205411 A1 | 10/2004 | Hong et al. | |
| 2005/0257207 A1 | 11/2005 | Blumfield et al. | |
| 2007/0044153 A1 | 2/2007 | Schuba et al. | |
| 2007/0074169 A1 | 3/2007 | Chess et al. | |
| 2008/0209276 A1* | 8/2008 | Stubbs | G06F 11/3688 |
| | | | 714/38.14 |
| 2009/0019545 A1 | 1/2009 | Ben-Itzhak et al. | |
| 2009/0113550 A1 | 4/2009 | Costa et al. | |
| 2009/0300764 A1 | 12/2009 | Freeman | |
| 2010/0058475 A1 | 3/2010 | Thummalapenta et al. | |
| 2010/0125913 A1 | 5/2010 | Davenport et al. | |
| 2011/0030061 A1 | 2/2011 | Artzi et al. | |
| 2011/0034733 A1 | 2/2011 | Funahashi et al. | |
| 2012/0167209 A1 | 6/2012 | Molnar et al. | |
| 2013/0019314 A1 | 1/2013 | Ji et al. | |
| 2013/0024942 A1 | 1/2013 | Wiegenstein et al. | |
| 2013/0247198 A1 | 9/2013 | Muttik et al. | |
| 2013/0312102 A1 | 11/2013 | Brake et al. | |
| 2014/0082737 A1* | 3/2014 | Beskrovny | H04L 63/1433 |
| | | | 726/25 |
| 2014/0165204 A1 | 6/2014 | Williams et al. | |
| 2014/0281740 A1 | 9/2014 | Casado et al. | |
| 2014/0331327 A1 | 11/2014 | Maor et al. | |
| 2014/0372985 A1 | 12/2014 | Levin et al. | |
| 2015/0261955 A1 | 9/2015 | Huang et al. | |
| 2017/0091457 A1 | 3/2017 | Zakorzhevsky et al. | |
| 2017/0123925 A1* | 5/2017 | Patnaik | G06F 21/577 |
| 2018/0025161 A1 | 1/2018 | Gauthier et al. | |

FOREIGN PATENT DOCUMENTS

| | | |
|---|---|---|
| WO | 2008047351 A1 | 4/2008 |
| WO | 2016108162 A1 | 7/2016 |
| WO | 2016113663 A1 | 7/2016 |

OTHER PUBLICATIONS

International Application # PCT/IB2015/059981 dated May 8, 2016.

International Application # PCT/IB2016/050106 dated Mar. 31, 2016.

Converity Inc., "Coverity® Development Testing Platform", 5 pages, year 2012.

Chess et al., "Dynamic Taint Propagation", 70 pages, Feb. 21, 2008.

European Application # 15875340.0 search report dated Apr. 3, 2018.

U.S. Appl. No. 15/535,732 office action dated Apr. 30, 2018.

European Application # 16737140.0 search report dated May 15, 2018.

Balzarotti et al., "Saner: Composing Static and Dynamic Analysis to Validate Sanitization in Web Applications", IEEE Symposium on Security and Privacy, pp. 387-401, May 18, 2018.

EP Application # 18171274.6 Search report dated Jun. 28, 2018.

International Application # PCT/IB2017/051321 Search Report dated Jun. 19, 2017.

* cited by examiner

INTEGRATED INTERACTIVE APPLICATION SECURITY TESTING

CROSS-REFERENCE TO RELATED APPLICATION

This application claims the benefit of U.S. Provisional Patent Application 62/310,827 filed Mar. 21, 2016, which is incorporated herein by reference.

FIELD OF THE INVENTION

The present invention relates generally to protecting against security vulnerabilities in computer programs, and particularly to methods, systems and software for testing application security.

BACKGROUND

Various techniques are known in the art for testing and protecting software applications against security vulnerabilities. A "vulnerability" in this context is a flaw or weakness in the application program that can be exploited by an unauthorized party (also referred to as an attacker) to gain access to secure information or otherwise modify the behavior of the program. For example, static application security testing (SAST) techniques are typically applied in order to detect security vulnerabilities in source code before the code is compiled and run. Dynamic application security testing (DAST), on the other hand, approaches the application as a "black box," and attempts to find vulnerabilities by bombarding the application during runtime with potentially harmful inputs.

As another example, runtime application self-protection (RASP) techniques can be used to protect software applications against security vulnerabilities by adding protection features into the application. In typical RASP implementations, these protection features are instrumented into the application runtime environment, for example by making appropriate changes and additions to the application code and/or operating platform. The instrumentation is designed to detect suspicious behavior during execution of the application and to initiate protective action when such behavior is detected. RASP techniques are described, for example, in PCT International Publication WO 2016/108162, which is assigned to the assignee of the present patent application and whose disclosure is incorporated herein by reference.

SUMMARY

Embodiments of the present invention that are described hereinbelow provide improved methods, systems and software for testing security of software applications.

There is therefore provided, in accordance with an embodiment of the invention, a method for testing a software application program, which includes recording a sequence of functional tests that are applied to the program and automatically identifying and collapsing sessions within the recorded functional tests. Modified tests are created by replacing parameters in the collapsed sessions with malicious inputs. The modified tests are applied to the program in order to detect security vulnerabilities in the program.

In some embodiments, recording the sequence of the functional tests includes capturing test traffic conveyed over a network between a test station and a server running the program. In one embodiment, the software application program is a Web application, and capturing the test traffic includes intercepting Hypertext Transfer Protocol (HTTP) requests sent by the test station and responses returned by the server. In some cases, intercepting the HTTP requests and responses includes identifying a correlation between a variable value of a request parameter in an HTTP request and a response parameter in an HTTP response previous to the HTTP request, and applying the modified tests includes generating test requests to the server while using the correlation to set the variable value of the request parameter in the test requests, based on the responses sent by the server during the modified tests.

In a disclosed embodiment, collapsing the sessions includes representing resource identifiers in each session by corresponding numbers, and eliminating repeating numbers and repeating sequences of the numbers in order to derive the collapsed sessions.

Additionally or alternatively, when each of the collapsed sessions includes at least one request submitted from a client to a server running the program, and the at least one request includes multiple parameters, applying the modified tests includes applying a sequence of the modified tests, such that a different one of the multiple parameters is replaced with an attack payload in each of the modified tests in the sequence. Further alternatively, applying the modified tests includes replacing all of the multiple parameters with attack payloads in one of the modified tests.

In some embodiments, applying the modified tests includes adding instrumentation to a version of the program, and while running the program and applying the modified tests to the version of the program, calling a security handler when the instrumentation generates an event, wherein the security handler detects a suspected vulnerability in the program by analyzing the event and responses of the program to the modified tests.

There is also provided, in accordance with an embodiment of the invention, apparatus for testing a software application program, including a memory, configured to store a recorded sequence of functional tests that are applied to the program. A processor is configured to automatically identify and collapse sessions within the recorded functional tests, to create modified tests by replacing parameters in the collapsed sessions with malicious inputs, and to apply the modified tests to the program in order to detect security vulnerabilities in the program.

There is additionally provided, in accordance with an embodiment of the invention, a computer software product for testing a software application program, the product including a non-transitory computer-readable medium in which program instructions are stored, which instructions, when ready by a computer, cause the computer to record sequence of functional tests that are applied to the program, to automatically identify and collapse sessions within the recorded functional tests, to create modified tests by replacing parameters in the collapsed sessions with malicious input, and to apply the modified tests to the program in order to detect security vulnerabilities in the program.

The present invention will be more fully understood from the following detailed description of the embodiments thereof, taken together with the drawings in which:

DETAILED DESCRIPTION OF EMBODIMENTS

Overview

Figure 1:
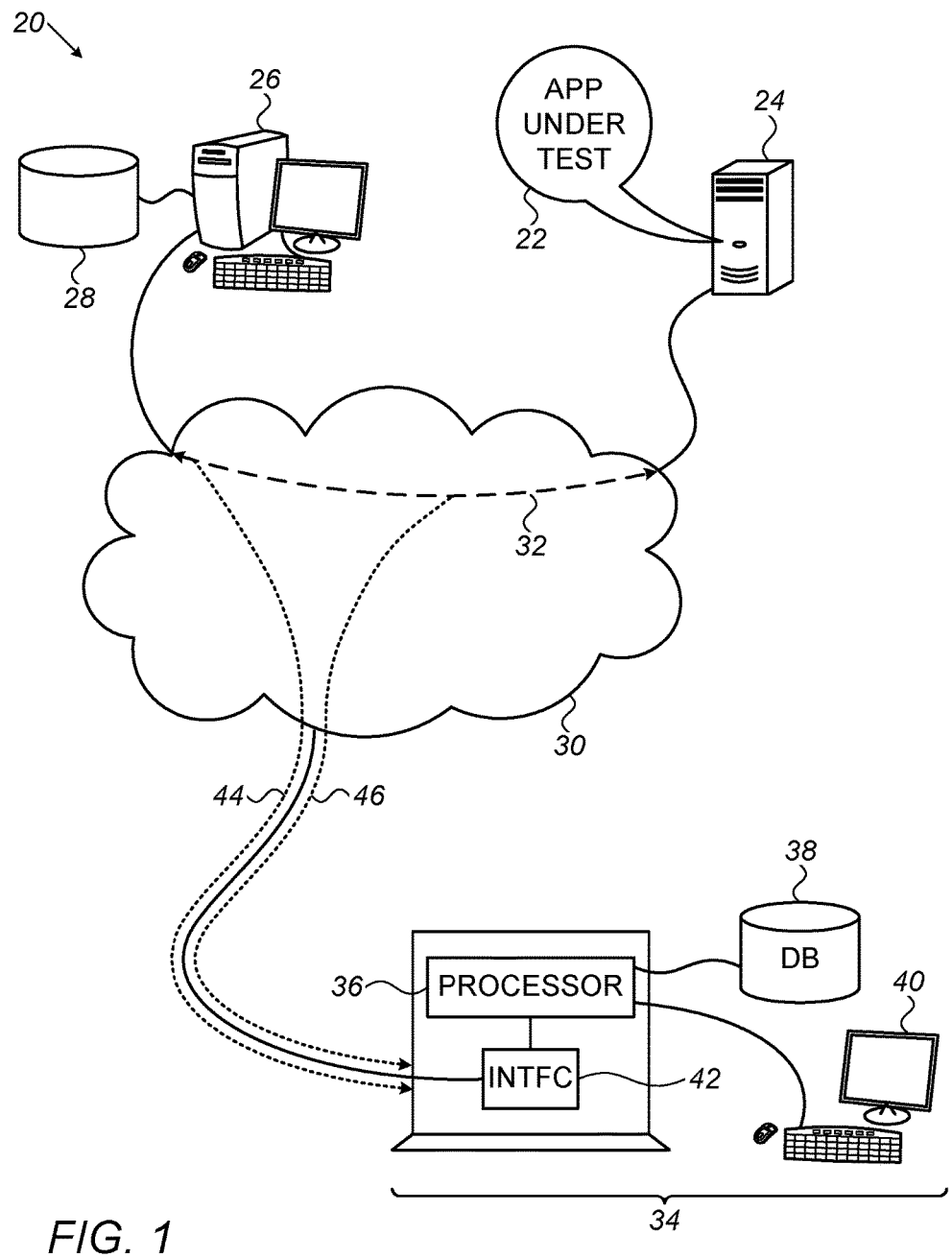
FIG. 1 is a block diagram that schematically illustrates a system for testing a software application, in accordance with an embodiment of the invention.

Software quality assurance (QA) testers generally run each version of an application through an exhaustive set of functional test scenarios in order to verify that the application operates as intended. In a Web application, for example, these scenarios will typically access all pages of the application, enter data into all fields, and actuate all on-screen controls. Any unexpected functionality (or lack of functionality) is reported back to the programming team as a bug to be repaired before the application version is released.

Application security testing seeks to uncover bugs of a different sort: vulnerabilities in the program that could be discovered and exploited by an attacker. Identifying these sorts of vulnerabilities is difficult, requiring substantial time, resources and training of personnel beyond general QA testing skills. Embodiments of the present invention that are described herein are useful in overcoming some of these difficulties, by applying automatic recording, analysis and processing to existing QA test scenarios in order to develop integrated, interactive application security testing (IAST) scenarios. Specifically, after recording a sequence of functional tests that are applied to a program under test, the IAST system automatically modifies one or more of the recorded functional tests to contain attack payloads, and then applies the modified tests to the application in order to detect security vulnerabilities in the program. These IAST scenarios may be run in conjunction with instrumentation of the application code in order to facilitate automatic identification of security vulnerabilities.

Assuming that the application to be tested already has a set of functional test scenarios used for QA or that functional test scenarios of this sort can be generated by a user (whether in a production or testing environment), IAST begins by recording these scenarios, as noted above. The recording can be performed by a dedicated IAST recorder component, typically in the form of a proxy or sniffer, or can be input to the IAST system in a standard format, such as JMX (as provided by JMeter, for example) or SeleniumHQ browser automation format. Any suitable sorts of functional tests can be recorded, including both manual and automatic testing, as well as penetration ("Pen") testing.

IAST processes these recordings in order to convert the QA functional tests into automated security tests. A key issue in this process of conversion is that the recordings may be long, especially if their origin is from a sniffer in the production environment. Therefore, in the disclosed embodiments, an IAST collapser component processes and optimizes the recorded QA tests as a preliminary stage in their conversion to security tests. The collapser typically identifies different usage scenarios (referred to as "sessions"), comprising sets of requests to a server running the application under test, for example, and splits up the recording into such sessions. The collapser then "collapses" the sessions by removing from each session duplications of similar requests, such as requests that differ only in their input parameters. The result of this stage is a set of optimal recordings, ready for the next stage of processing.

When the QA recordings are updated as a result of extending QA coverage or additional data collected by the sniffer, the IAST collapser can merge the new data with the existing recordings, while still removing duplications in order to keep an optimal set of sessions for testing. For this purpose, the recorder and collapser may operate continuously as a background process in the QA environment, in order to gradually learn all relevant sessions. In the long run, the collapser will reduce these recordings to a stable set of sessions, as long as there are no further changes in the coverage or additional functionalities discovered by the recorder.

As the next stage, an IAST test generator component operates on the optimized set of sessions produced by the collapser in order to generate actual security tests. For this purpose, the test generator replaces each parameter in the sessions that can be considered a potential input with a list of known malicious payloads. For detection of security vulnerabilities, these payloads can include, for example, strings that are used for SQL (structured query language) injection, reflected XSS (cross-site scripting), path manipulation, and other attacks that are known in the art. The result of this test generation stage is a set of automated security test scenarios, comprising requests taken from the original recordings but enhanced with malicious payloads for security testing, following optimization by the collapser.

Finally, the test generator applies the security test scenarios to the software application program under test, for example as client requests to a server running the application. The scenarios can be supplemented with additional metadata regarding the security vulnerability or vulnerabilities that are to be tested in each scenario. The QA team can easily integrate these new security testing scenarios with their existing functional test scenarios, and may thus combine the security tests and functional tests in a common test automation framework, such as the above-mentioned SeleniumHQ framework. In this case, the QA team can test not only functionality, but also security.

Additionally or alternatively, the replaying of the recorded test scenarios can be performed in a dedicated testing environment, in which a version of the application is deployed with an additional security detection layer instrumented into the program code. For example, an instrumentation agent may instrument input and output points in the program, and possibly other sensitive points, with code that calls a security handler when appropriate. The instrumentation may be applied in a manner similar to the sort of code instrumentation that is described in the above-mentioned WO 2016/108162, or in PCT International Publication WO 2016/113663, whose disclosure is likewise incorporated herein by reference (except that in the present case, the instrumentation is used in a test environment, rather than in a deployed application).

When the security test scenario reproduces a real or potential vulnerability, the security detection layer will detect a corresponding event during testing and will report the event to a dedicated security handler component of the IAST system. The security handler analyzes the event and the corresponding response of the program under test, and thus reports suspected vulnerabilities to an IAST manager component. The IAST manager stores the test results in a database and can display them for user review on a dedicated dashboard. These IAST test results can be integrated with other sorts of security test outputs, such as the results of static application security testing (SAST).

System Description

FIG. 1 is a block diagram that schematically illustrates a system 20 for testing a software application 22, in accordance with an embodiment of the invention. In the present example, application 22 is assumed to be a client/server application, such as a Web application, which runs on a server 24. A QA test station 26 applies QA test scenarios to application 22, for example by conveying requests to and receiving responses from server 24 via a network 30. The test scenarios are stored in a memory 28 of test station 26, and the requests and responses normally travel over a path 32 through network 30. Alternatively, other QA test configurations are possible, including configurations in which the client and server of application 22 run on the same physical machine, using different virtual machines, for example, with emulation of network communications between them.

An IAST station 34 records communications between station 26 and server 24 in order to generate and apply security tests to application 22. Station 34 typically comprises a general-purpose computer, comprising a processor 36, which is programmed in software to carry out the functions that are described herein. This software may be downloaded to station 34 in electronic form, over a network, for example. Alternatively or additionally, the software may be stored on tangible, non-transitory computer-readable media, such as optical, magnetic or electronic memory media. Further alternatively or additionally, at least some of the functions of processor may be implemented in hard-wired or programmable hardware logic circuits. Furthermore, although IAST station 34 is shown and referred to in the figures as a separate, standalone unit, the functions of the IAST station may alternatively be integrated and run on the same computer as those of QA test station 26.

IAST station 34 comprises a memory 38, which stores a security testing database, and a user interface 40, which enables testing personnel to manipulate the test scenarios that station 34 applies to application 22 and to view test results generated by processor 36. Station 34 is coupled to network 30 by a suitable network interface 42. Station 34 is thus able to intercept and record requests submitted by QA test station 26 to server 24, via an input path 44, and to submit requests to and receive responses from server 24, via an output path 46. For purposes of recording function test scenarios, QA test station 26 may be configured to communicate with server 24 through IAST station 34 as a proxy, via paths 44 and 46. Alternatively, a switch (not shown) in network 30 may be configured to mirror communications between QA test station 20 and server 24 to IAST station 34, in which case IAST station 34 acts as a sniffer on path 32. Security test scenarios developed by IAST station 34 may be applied to server 24 by processor over path 46; or they may, alternatively or additionally, be downloaded to QA test station 26 for application to server 24, either on their own or as a part of the QA testing suite of application 22.

Figure 2:
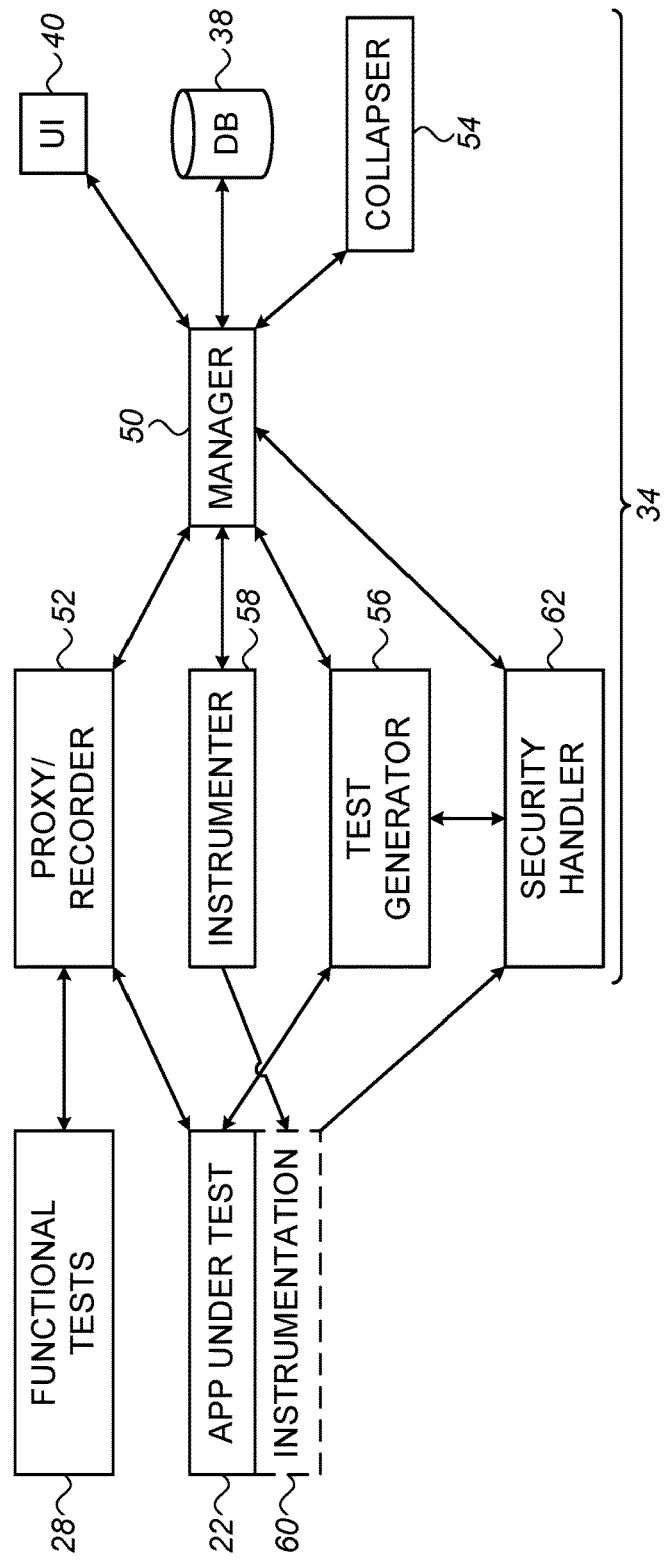
FIG. 2 is a block diagram that schematically shows functional details of an application security test station, in accordance with an embodiment of the invention.

FIG. 2 is a block diagram that schematically shows functional details of IAST station 34, in accordance with an embodiment of the invention. The elements shown in FIG. 2 are typically implemented as software modules running on processor 36. These elements were described generally in the preceding section. The following description gives additional details of the implementation and functionality of some of the software components, assuming that IAST station 34 is applied in testing Web applications:

A manager 50 manages all operations needed for IAST, while exposing a representational state transfer (REST) application program interface (API) to other components and working with the security testing database (DB) that is stored in memory 38.

The database in memory 38 contains all data needed for IAST, so that other system components can be stateless.

A recorder 52 exposes proxies or sniffers for the functional testing environment, and thus captures QA test traffic between station 26 and server 24 and passes it to manager 50. Recorder 52 can also be used in a production environment, in which case it records application use in "live" operation.

A collapser 54 divides recorded traffic into logical scenarios, referred to as "sessions," and minimizes recorded traffic by eliminating repetitions in records.

A test generator 56 takes previously recorded and collapsed traffic and payloads, generates requests (for example, HTTP traffic) to test different types of attacks, plays the requests on application 22, and may generate events based on application responses. Test generator 56 can receive as input not only sessions recorded by recorder 52 and processed by collapser 54, but also existing scripts, such as SeleniumHQ or JMeter scripts. The test generator can take these scripts and enrich them with security tests, after which QA testing can use these test scripts not only for functional tests, but also for security tests.

An instrumenter 58 adds instrumentation 60 to the code of application 22, which then issues events at points of interest (such as inputs and outputs) during execution.

A security handler 62 exposes a REST API for catching runtime security events issued by test generator 56 and/or instrumentation 60, analyzes events, and reports vulnerabilities that are discovered to manager 50.

Method of Iast Operation

Figure 3:
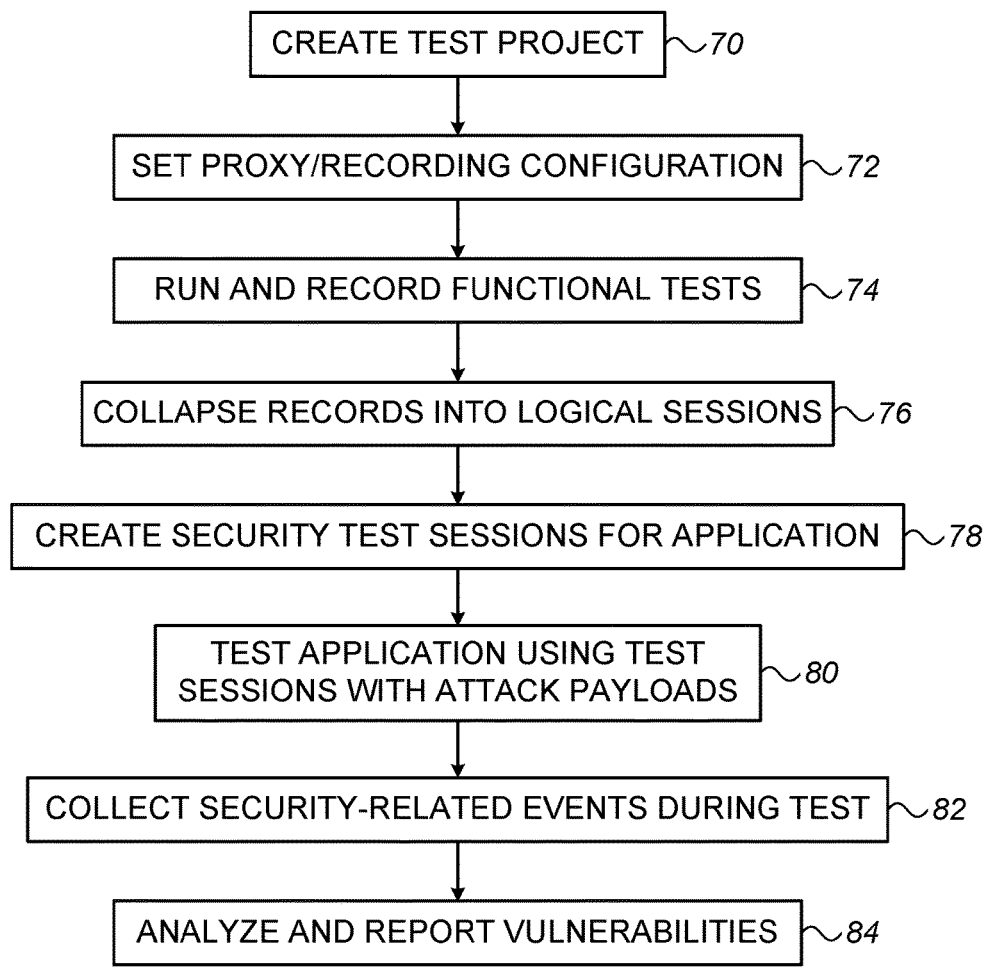
FIG. 3 is a flow chart that schematically illustrates a method for application security testing, in accordance with an embodiment of the invention.

FIG. 3 is a flow chart that schematically illustrates a method for application security testing, in accordance with an embodiment of the invention. The method is described, for the sake of convenience and clarity, with reference to the system and software configurations that are shown in FIGS. 1 and 2, and under the assumption that application 22, to which the testing is applied, is a Web application. A simple example of the operation of the method of FIG. 3 in generating a security test of a Web application is presented below in an Appendix. Alternatively, the principles of this method may be implemented, mutatis mutandis, in other hardware and software configurations, as will be apparent to those skilled in the art after reading the present description. All such alternative implementations are considered to be within the scope of the present invention.

Operation of IAST station 34 is initiated when a user creates a new test project, at a test creation step 70. At this stage, the user typically defines a project identifier (ID), which identifies application 22; a uniform resource locator (URL) filter for recording Hypertext Transfer Protocol (HTTP) requests submitted to the application; and an instrumented application (agent) address where the application under test is installed and instrumented. Manager 50 returns a proxy Internet Protocol (IP) address and port. The user then sets the proxy configuration of QA test station to work with IAST recorder 52 as its HTTP proxy, so that HTTP requests from station 26 to application 22 on server 24, as well as HTTP responses from application 22 to station 26, will be routed through IAST station 34.

Once system 20 has been configured in the above manner, the user (or the user's test automation system) runs functional tests stored in memory 28 of station 26 via the IAST proxy, at a QA test recording step 74. Whether applications are tested using black-box tests, or QA manually or automatically browses an application in order to find functional and performance defects, recorder 52 records all HTTP application traffic in a manner that is transparent to existing QA tests, and stores the recorded test sequences in memory 38. HTTP requests that are riot relevant to application testing are transparent passed over by te URL filter mentioned above: When a new HTTP request arrives, it is checked against this filter and recorded only if the URL meets the filter criteria. Otherwise, the HTTP request is transparently passed to the application without recording.

Collapser 54 reads all records created by recorder 52, divides them into logical sessions, and then eliminates repetitions to create collapsed sessions for subsequent security testing, at a collapsing step 76. In the present example, collapser 54 receives as input the raw HTTP data that was recorded by recorder 52 and outputs HTTP scenarios. For this purpose, collapser 52 may apply the following algorithm to the raw HTTP data in order to derive collapsed sessions:

Divide raw data into buckets by project ID and client address.
Divide up each bucket into smaller buckets by time inactivity windows. (X seconds of inactivity will divide a bucket from the preceding bucket. For example, X can be 300 sec at the beginning of operation.)
Divide up each of these smaller buckets by session ID. (Different session IDs should be in different buckets.)
For each bucket remaining after this process of division and subdivision: Each resource identifier, such as a URL in Web applications, but not including variable parameters, is represented by a number. The number is computed, for example, by computing a hash function over the URL. Each bucket is then represented as a sequence of these numbers.
For single-page applications, a page parameter can be included in the hash computation.
Consecutive repetitions of the same number are eliminated. (For example, "5, 6, 1, 3, 3, 3, 9" will be collapsed to "5, 6, 1, 3, 9")
Consecutive repeating sequences are eliminated. (For example, "5, 6, 7, 3, 9 ,1, 3, 9, 1, 4, 3" will be collapsed to "5, 1, 4, 3"; but "5, 6, 7, 3, 9, 1, 8, 4, 3, 9, 1, 4, 3" will remain as is.)

When IAST station 34 receives and records new raw data, collapser 54 divides the new data into buckets and removes repeating buckets and sub-sequences, as described above, and then compares the resulting sessions to the sequences of buckets in existing sessions. The collapser will then discard sessions that have already been captured and add new sessions as needed. Collapser 54, together with recorder 52, can thus automatically catch changes in application 22 and in this manner creates and updates the basis for security test scenaarios that give full coverage. For this purpose, it is desirable that the recorder and collapser be up and running at all times during QA testing, so that any changes are caught immediately.

Returning now to FIG. 3, based on the logical sessions generated at step 76, test generator 56 creates security test sessions for application 22, at a test generation step 78. Typically, manager 50 gives test generator 56 a list of attacks to identify, based on criteria input by the user. Test generator 56 creates HTTP requests for each attack based on the recorded sessions and attack payloads appropriate to the attacks on the list. Generation and application of these IAST security test sessions are presented here as separate operations for the sake of conceptual clarity, but in practice, test generator 56 may create and apply such tests on the fly.

Certain scenarios may require on-the-fly generation and application of test requests, as illustrated by examples presented further below.

Test generator 56 can apply a number of different approaches to create and replay sessions with payloads, for example:

1. Slower Approach with Good Coverage:
    Take one parameter from one HTTP request from a given session, replace it with an attack payload, and replay this session
    Repeat the above by choosing another parameter from the same or another request until all parameters of all requests are covered.
2. Slow Approach with Slightly Inferior Coverage:
    Take one parameter from one HTTP request and replace it with an attack payload, while the remaining parameters are unchanged.
    Send the request, and then repeat the above step for another parameter until all parameters one by one are sent with an attack payload.
    After testing all parameters in this manner, send a valid request (i.e., a request containing parameters that application 22 will accept as valid, without any other requests in parallel), and then go to a new request and repeat the above steps.
3. Faster Approach with Less Good Coverage:
    Take one HTTP request and replace all parameters with attack payloads.
    Repeat the above until all session requests have been covered.
4. Fastest Approach with Spotty Coverage:
    Replace all parameters in all requests with attack payloads.

Test generator 56 can apply other techniques, in addition to substitution of attack payloads, in order to detect particular types of vulnerabilities. In one embodiment, test generator 56 uses recorded sessions in creating test sessions to detect vulnerabilities connected to business logic. For example, to detect a vulnerability stemming from insufficient or broken logout in an application (when logout does not actually clear user data), the test generator can use the following technique:
    1. Take a recorded session and find a login request.
    2. Find a request after login that redirects to login when no authentication exists, and record the redirected response.
    3. Play login with valid authentication (from the recorded session).
    4. Play the request found in (2), and if the response is different from (3), record it.
    5. Find and play a logout request.
    6. Now replay the request as in (4), and compare the response with the response from (4). If the result is the same, the logout is insufficient, and an event is reported to security handler 62.

The user actuates system 20 to perform a security scan of application 22 using the test sessions generated by test generator 56, at a test actuation step 80. For this purpose, the user may install or invoke a version of application 22 that includes instrumentation 60 added by instrumenter 58. During the scan, test generator 56 replays test sessions, during which requests with attack payloads are submitted to application 22. Test generator 56 reviews responses returned by application 22 and reports events to security handler 62 when the responses are indicative of possible vulnerabilities, at an event collection step 82. Additionally or alternatively, instrumentation 60 reports security-related events to security handler 62.

Security handler 62 analyzes the events that it has received and, based on the analysis, reports vulnerabilities to manager 50, at a vulnerability reporting step 84. Manager 50 typically reports these results to the user, via user interface 40, for example, and/or stores them in memory 38 for subsequent review and analysis.

As noted earlier, there are some applications that are not amenable to testing simply by replaying recorded HTTP requests with substituted attack payloads. For example, some applications use parameters with variable (dynamic) values, and replaying a previously-recorded value "as is" will be rejected by the application. A Web site, for instance, can use a special random token in each request having a one-time value, so that the previously-recorded value cannot simply be replayed. The application in this case may include a login form containing user and password fields, along with a hidden field holding a random token. When a user fills in his username and password and submits the form to the server, the random token is also sent. Upon receiving the form, the site checks the user credentials (username/password) and also checks that the random token received with the form is the same as was previously generated. This technique prevents an attacker from recording and replaying user authentication traffic, but will have the same effect on test generator 56. As another example, some applications require the client to compute and submit a parameter, which will have a different value each time it is computed.

To overcome this problem of replaying HTTP traffic with dynamic parameter values, IAST station 34 can apply the following algorithm in generating test requests on the fly, taking advantage of both request and response traffic captured by recorder 52:

1. While generating the test scenario, automatically correlate between a hidden field in a previous response from server 24 and a current request submitted by the client (running on QA station 26, for example). If a parameter sent in the response appears in the request in a hidden field, the value of this parameter in the request generated by test generator 56 should be taken from the preceding response and not from recorded data. For purposes of implementation, collapser 54 may carry out the correlation between responses and requests and save corresponding correlation metadata, which is then applied by test generator 56 in generating test traffic that uses the correct parameter values.
2. While generating the test scenario, automatically correlate between parameters of a previous response and the current request over two or more recording sessions.

If there is a correlation between a value x in a request and parameter y in the corresponding response, then instead of simply replaying the request with the value of x as it was recorded, test generator 56 should set the value x based on the latest value of the parameter y. Again, collapser 54 computes and saves the correlation metadata for use by the test generator.

3. In cases in which a parameter value is computed on the client side and the computation is different each time, the user can manually customize the replay logic by supplying a computation rule via user interface 40. Manager 50 saves the rule in memory 38, where it can be accessed by test generator 56 as needed.

It will be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

Appendix—Example Scenario

The following is an example of a simple functional test scenario of payment in a bookstore site, illustrating how a QA test is converted into a series of security test sessions by IAST station 34, using the methods described above. The bookstore application includes the following sequence of steps:
 1. Find a book
 2. Add to shopping bin
 3. Login
 4. Payment
 5. Logout The QA tester may wish to check only the payment page, but it is not possible to do so without choosing a book, adding it to the shopping bin, and doing a login. Recording the above scenario in its entirety thus enables the IAST station to check vulnerabilities on the payment page. (Without this scenario, which provides the proper mode of navigation to the payment page, security testing of the payment page may not be meaningful.)

In this example, we assume that the original scenario recorded by recorder 52 contains fifteen requests:
 1. http://www.bookstore.com/home.jsp
 2. http://www.bookstore.com/bookSearch.jsp
 3. http://www.bookstore.com/searchResult.jsp?title=Programmimg
 4. http://www.bookstore.com/addToBin.jsp?bookId=5
 5. http://www.bookstore.com/bookSearch.jsp
 6. http://www.bookstore.com/searchResult.jsp?title=Java
 7. http://www.bookstore.com/addToBin.jsp?bookId=13
 8. http://www.bookstore.com/bookSearch.jsp
 9. http://www.bookstore.com/searchResult.jsp?title=C#
 10. http://www.bookstore.com/addToBin.jsp?bookId=118
 11. http://www.bookstore.com/login.jsp
 12. http://www.bookstore.com/login.jsp?user=Alex&pass=123
 13. http://www.bookstore.com/ShowBin.jsp
 14. http://www.bookstore.com/payment.jsp
 15. http://www.bookstore.com/logout.jsp In processing this recording, collapser 54 finds that requests 2, 3, 4 (book search, results and add to bin) are repeated in requests 5, 6, 7 and also in 8, 9, 10. The collapser eliminates this duplication and thus achieves a more concise session:
 1. http://www.bookstore.com/home.jsp
 2. http://www.bookstore.com/bookSearch.jsp
 3. http://www.bookstore.com/searchResult.jsp?title=Programmimg
 4. http://www.bookstore.com/addToBin.jsp?bookId=5
 5. http://www.bookstore.com/login.jsp
 6. http://www.bookstore.com/login.jsp?user=Alex&pass=123
 7. http://www.bookstore.com/ShowBin.jsp
 8. http://www.bookstore.com/payment.jsp
 9. http://www.bookstore.com/logout.jsp Now test generator 56 will build the following sessions. (In each session only one parameter is replaced with an attack payload.) For example, with an SQL Injection payload of ' or '1'='1 we get four sessions to replay:

First Session:
1. http://www.bookstore.com/home.jsp
2. http://www.bookstore.com/bookSearch.jsp
3. http://www.bookstore.com/searchResult.jsp?title=' or '1'='1
4. http://www.bookstore.com/addToBin.jsp?bookId=5
5. http://www.bookstore.com/login.jsp
6. http://www.bookstore.com/login.jsp?user=Alex&pass=123
7. http://www.bookstore.com/ShowBin.jsp
8. http://www.bookstore.com/payment.jsp
9. http://www.bookstore.com/logout.jsp
Second Session
1. http://www.bookstore.com/home.jsp
2. http://www.bookstore.com/bookSearch.jsp
3. http://www.bookstore.com/searchResult.jsp?title=Programmimg
4. http://www.bookstore.com/addToBin.jsp?bookId=' or '1'='1
5. http://www.bookstore.com/login.jsp
6. http://www.bookstore.com/login.jsp?user=Alex&pass=123
7. http://www.bookstore.com/ShowBin.jsp
8. http://www.bookstore.com/payment.jsp
9. http://www.bookstore.com/logout.jsp
Third Session
1. http://www.bookstore.com/home.jsp
2. http://www.bookstore.com/bookSearch.jsp
3. http://www.bookstore.com/searchResult.jsp?title=Programming
4. http://www.bookstore.com/addToBin.jsp?bookId=5
5. http://www.bookstore.com/login.jsp
6. http://www.bookstore.com/login.jsp?user=' or '1'='1&pass=123
7. http://www.bookstore.com/ShowBin.jsp
8. http://www.bookstore.com/payment.jsp
9. http://www.bookstore.com/logout.jsp
Fourth Session
1. http://www.bookstore.com/home.jsp
2. http://www.bookstore.com/bookSearch.jsp
3. http://www.bookstore.com/searchResult.jsp?title=Programming
4. http://www.bookstore.com/addToBin.jsp?bookId=5
5. http://www.bookstore.com/login.jsp
6. http://www.bookstore.com/login.jsp?user=Alex&pass=' or '1'='1
7. http://www.bookstore.com/ShowBin.jsp
8. http://www.bookstore.com/payment.jsp
9. http://www.bookstore.com/logout.jsp Test generator 56 and/or instrumentation 60 evaluate the behavior of the application under test in response to the above scenarios, and submit events to security handler 62 when the possible vulnerabilities are discovered.

The invention claimed is:

1. A method for testing a software application program, comprising:
recording a sequence of functional tests that are applied to the program;
automatically identifying and collapsing sessions within the recorded functional tests;
creating modified tests by replacing parameters in the collapsed sessions with malicious inputs; and
applying the modified tests to the program in order to detect security vulnerabilities in the program,
wherein applying the modified tests comprises:
adding instrumentation to a version of the program; and
while running the program and applying the modified tests to the version of the program, calling a security handler when the instrumentation generates an event,
wherein the security handler detects a suspected vulnerability in the program by analyzing the event and responses of the program to the modified tests.

2. The method according to claim 1, wherein recording the sequence of the functional tests comprises capturing test traffic conveyed over a network between a test station and a server running the program.

3. The method according to claim 2, wherein the software application program is a Web application, and wherein capturing the test traffic comprises intercepting Hypertext Transfer Protocol (HTTP) requests sent by the test station and responses returned by the server.

4. A method for testing a software application program, comprising:
recording a sequence of functional tests that are applied to the program, wherein recording the sequence of the functional tests comprises capturing test traffic conveyed over a network between a test station and a server running the program;
automatically identifying and collapsing sessions within the recorded functional tests;
creating modified tests by replacing parameters in the collapsed sessions with malicious inputs; and
applying the modified tests to the program in order to detect security vulnerabilities in the program,
wherein the software application program is a Web application, and wherein capturing the test traffic comprises intercepting Hypertext Transfer Protocol (HTTP) requests sent by the test station and responses returned by the server,
wherein intercepting the HTTP requests and responses comprises identifying a correlation between a variable value of a request parameter in an HTTP request and a response parameter in an HTTP response previous to the HTTP request, and
wherein applying the modified tests comprises generating test requests to the server while using the correlation to set the variable value of the request parameter in the test requests, based on the responses sent by the server during the modified tests.

5. The method according to claim 1, wherein collapsing the sessions comprises representing resource identifiers in each session by corresponding numbers, and eliminating repeating numbers and repeating sequences of the numbers in order to derive the collapsed sessions.

6. The method according to claim 1, wherein each of the collapsed sessions comprises at least one request submitted from a client to a server running the program, and the at least one request comprises multiple parameters, and
wherein applying the modified tests comprises applying a sequence of the modified tests, such that a different one of the multiple parameters is replaced with an attack payload in each of the modified tests in the sequence.

7. The method according to claim 1, wherein each of the collapsed sessions comprises at least one request submitted from a client to a server running the program, and the at least one request comprises multiple parameters, and
wherein applying the modified tests comprises replacing all of the multiple parameters with attack payloads in one of the modified tests.

8. The method according to claim 4, wherein applying the modified tests comprises:
adding instrumentation to a version of the program; and while running the program and applying the modified tests to the version of the program, calling a security handler when the instrumentation generates an event, wherein the security handler detects a suspected vulnerability in the program by analyzing the event and responses of the program to the modified tests.

9. Apparatus for testing a software application program, comprising:
a memory, configured to store a recorded sequence of functional tests that are applied to the program; and
a processor, which is configured to automatically identify and collapse sessions within the recorded functional tests, to create modified tests by replacing parameters in the collapsed sessions with malicious inputs, and to apply the modified tests to the program in order to detect security vulnerabilities in the program, and
wherein the processor is configured to add instrumentation to a version of the program, wherein the instrumentation generates events in response to applying the modified tests while running the version of the program, and wherein the processor is configured to detect a suspected vulnerability in the program by analyzing the event and responses of the program to the modified tests.

10. The apparatus according to claim 9, and comprising a network interface configured to be coupled to a network, wherein the processor is configured to record the sequence of the functional tests by capturing, via the network interface, test traffic conveyed over the network between a test station and a server running the program.

11. The apparatus according to claim 10, wherein the software application program is a Web application, and wherein the test traffic comprises Hypertext Transfer Protocol (HTTP) requests sent by the test station and responses returned by the server.

12. Apparatus for testing a software application program, comprising:
a memory, configured to store a recorded sequence of functional tests that are applied to the program;
a processor, which is configured to automatically identify and collapse sessions within the recorded functional tests, to create modified tests by replacing parameters in the collapsed sessions with malicious inputs, and to apply the modified tests to the program in order to detect security vulnerabilities in the program; and
a network interface configured to be coupled to a network, wherein the processor is configured to record the sequence of the functional tests by capturing, via the network interface, test traffic conveyed over the network between a test station and a server running the program,
wherein the software application program is a Web application, and wherein the test traffic comprises Hypertext Transfer Protocol (HTTP) requests sent by the test station and responses returned by the server, and
wherein the processor is configured to identify a correlation between a variable value of a request parameter in an HTTP request and a response parameter in an HTTP response previous to the HTTP request, and to use the correlation in setting the variable value of the request parameter in test requests submitted to the server, based on the responses sent by the server during the modified tests.

13. The apparatus according to claim 9, wherein collapsing the sessions comprises representing resource identifiers in each session by corresponding numbers, and eliminating repeating numbers and repeating sequences of the numbers in order to derive the collapsed sessions.

14. The apparatus according to claim 9, wherein each of the collapsed sessions comprises at least one request submitted from a client to a server running the program, and the at least one request comprises multiple parameters, and wherein the processor is configured to apply a sequence of the modified tests to the server running the program, such that a different one of the multiple parameters is replaced with an attack payload in each of the modified tests in the sequence.

15. The apparatus according to claim 9, wherein each of the collapsed sessions comprises at least one request submitted from a client to a server running the program, and the at least one request comprises multiple parameters, and wherein the processor is configured to replace all of the multiple parameters with attack payloads in one of the modified tests.

16. The apparatus according to claim 12, wherein the processor is configured to add instrumentation to a version of the program, wherein the instrumentation generates events in response to applying the modified tests while running the version of the program, and wherein the processor is configured to detect a suspected vulnerability in the program by analyzing the event and responses of the program to the modified tests.

17. A computer software product for testing a software application program, the product comprising a non-transitory computer-readable medium in which program instructions are stored, which instructions, when ready by a computer, cause the computer to record sequence of functional tests that are applied to the program, to automatically identify and collapse sessions within the recorded functional tests, to create modified tests by replacing parameters in the collapsed sessions with malicious input, and to apply the modified tests to the program in order to detect security vulnerabilities in the program,
wherein the instructions cause the computer to add instrumentation to a version of the program, wherein the instrumentation generates events in response to applying the modified tests while running the version of the program, and wherein the instructions cause the computer to detect a suspected vulnerability in the program by analyzing the event and responses of the program to the modified tests.

18. The product according to claim 17, wherein the instructions cause the computer to record the sequence of the functional tests by capturing test traffic conveyed over a network between a test station and a server running the program.

19. The product according to claim 18, wherein the software application program is a Web application, and wherein the test traffic comprises Hypertext Transfer Protocol (HTTP) requests sent by the test station and responses returned by the server.

20. A computer software product for testing a software application program, the product comprising a non-transitory computer-readable medium in which program instructions are stored, which instructions, when ready by a computer, cause the computer to record sequence of functional tests that are applied to the program, to automatically identify and collapse sessions within the recorded functional tests, to create modified tests by replacing parameters in the collapsed sessions with malicious input, and to apply the modified tests to the program in order to detect security vulnerabilities in the program,
wherein the instructions cause the computer to record the sequence of the functional tests by capturing test traffic conveyed over a network between a test station and a server running the program, wherein the software application program is a Web application, and wherein the test traffic comprises Hypertext Transfer Protocol (HTTP) requests sent by the test station and responses returned by the server, and wherein the instructions cause the computer to identify a correlation between a variable value of a request parameter in an HTTP request and a response parameter in an HTTP response previous to the HTTP request, and to use the correlation in setting the variable value of the request parameter in test requests submitted to the server, based on the responses sent by the server during the modified tests.

21. The product according to claim 17, wherein collapsing the sessions comprises representing resource identifiers in each session by corresponding numbers, and eliminating repeating numbers and repeating sequences of the numbers in order to derive the collapsed sessions.

22. The product according to claim 17, wherein each of the collapsed sessions comprises at least one request submitted from a client to a server running the program, and the at least one request comprises multiple parameters, and wherein the instructions cause the computer to apply a sequence of the modified tests to the server running the program, such that a different one of the multiple parameters is replaced with an attack payload in each of the modified tests in the sequence.

23. The product according to claim 17, wherein each of the collapsed sessions comprises at least one request submitted from a client to a server running the program, and the at least one request comprises multiple parameters, and wherein the instructions cause the computer to replace all of the multiple parameters with attack payloads in one of the modified tests.

24. The product according to claim 20, wherein the instructions cause the computer to add instrumentation to a version of the program, wherein the instrumentation generates events in response to applying the modified tests while running the version of the program, and wherein the instructions cause the computer to detect a suspected vulnerability in the program by analyzing the event and responses of the program to the modified tests.

* * * * *